May 20, 1930.  H. KATTWINKEL  1,759,356
POWER TRANSMITTING MEANS
Filed Dec. 18, 1926

Inventor;
Hans Kattwinkel.
By his Attorney,
Harold D. Penney.

Patented May 20, 1930

1,759,356

UNITED STATES PATENT OFFICE

HANS KATTWINKEL, OF COSWIG, SAXE, GERMANY

POWER-TRANSMITTING MEANS

Application filed December 18, 1926, Serial No. 155,705, and in Germany March 9, 1926.

My invention relates to improvements in power transmitting means, and more particularly in power transmitting elements designed for use in shaft couplings for automobiles and other vehicles, as described in my pending application Ser. No. 747,680 filed Nov. 3, 1924 which has since matured into Patent No. 1,676,333.

Elastic intermediate members for universal joints and the like which consist according to the said former application of a tension member containing the eyes of the draw bolts and embedded in a mass of rubber or the like, have been found, when in use, to suffer from the draw-back that the embedded tension member which as a rule consists of a wire rope lying directly against the outer walls of the bolt sleeves, becomes detached from the bolt sleeves and also becomes loosened with respect to the rubber material. This in time leads to the destruction of the tension member, so that in certain circumstances the entire coupling member may become useless. I have found that this loosening of the tension member is to be accounted for by the fact, that the coupling member, more particularly when used as a torque transmitter for the universal joints of power driven vehicles, is subjected not only to tensional but also to compressive stresses, the compressive stresses referred to always occurring when the portion of the set of shafts or the like to be driven by the coupling overruns the driving shaft. Experience has shown, that the alternations in the stressing of the coupling member caused thereby, very frequently occur and have a detrimental effect on the life of the coupling member.

My invention overcomes the drawbacks due to the state of affairs described by providing that the wire rope or the like embracing the coupling bushes is kept continuously in direct contact with the sleeves. This is effected by means of separate caps made preferably of sheet metal, which on the one hand are held by the bolt sleeves and on the other hand embrace those parts of the coupling member which lie opposite to the places where the wire rope lies against the bolt sleeves.

Figure 1:
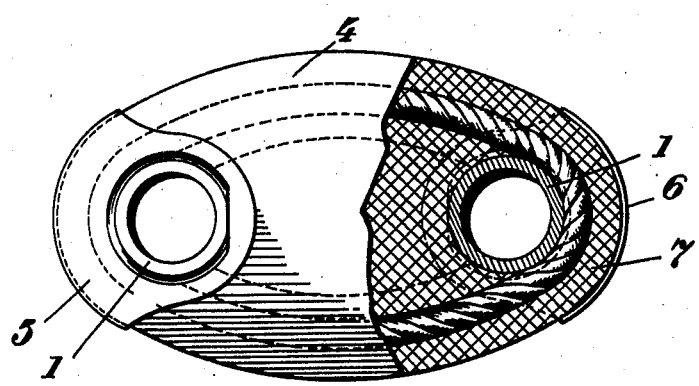
Figure 2:
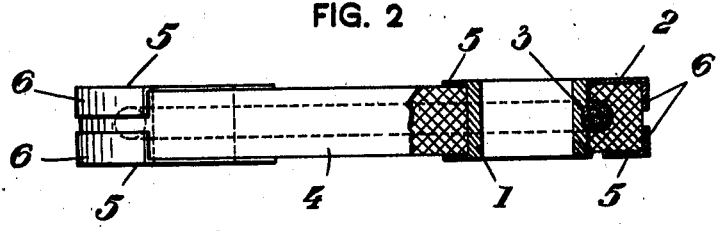

A constructional example of my invention is shown in the drawing, Figure 1 representing a coupling member constructed in accordance with the invention, viewed from the flat side and partly in section parallel to the plane of the member, while Figure 2 shows the coupling member as viewed from the edge partly in section perpendicular to the plane of the member.

1 are the two eyes or bushes which embrace the draw bolts, and which differ from those of the main patent in that they are not bobbin like, as in the main patent, but are substantially plain right through. The tension member 2 consisting of a winding of wire strands stranded to form a single rope, is secured in position against lateral displacement as will be seen in Figure 2, by the rope being laid into grooves 3 provided in the outer sides of the sleeves 1. The rope 2 along with the sleeves 1, 1 is embedded in the mass of rubber 4, a bulging intermediate piece being preferably inserted which is indicated in Figure 1 by dotted lines, which mass of rubber after being vulcanized gives the entire structure the final elliptical shape.

According to the invention two cap-like members 5, 5 of sheet steel are attached to each of the sleeves 1, 1. The connection to the sleeves is effected, as will be seen from Figure 2, by corresponding circular openings in the cap being pushed over the ends of the sleeves, which slightly project beyond the lateral surfaces of the rubber body 4, and the said ends being thereupon beaded over. The caps are flat as regards the part lying against the flat sides of the coupling member. At the narrow sides of the coupling member they form inwardly bent over flanges 6, 6, which closely embrace the corresponding parts of the member 4 and thereby prevent the rope 2 lifting at the places in question from the sleeves 1, even when inwardly directed forces act on the sleeves. The reason for this is that these forces are transmitted to the caps 5, which themselves act through the intermediate layers 7 of rubber on the rope 2, thereby keeping the rope always in close contact against the particular sleeve. In this way a loosening of the rope with respect to the sleeves is prevented in a reliable manner and consequently the destruction which would otherwise soon take place.

I claim:—

1. A resilient tensile force transmitting member, more particularly for the universal joints in automobiles and the like, comprising, a body capable of yielding resiliently to pressure, an endless flexible tensile member circumferentially enclosing said body, means to receive external bolt means to be attached to said tensile member, and means embracing said tensile member to hold said tensile member permanently against said receiving means.

2. A resilient tensile force transmitting member, more particularly for the universal joints in automobiles and the like, comprising, a body capable of yielding resiliently to pressure, a tensile member enclosing said body on two opposite sides, sleeves for attaching connecting bolts within said tensile member, and clamps embracing said tensile member and adapted to hold it against said sleeves.

3. A resilient tensile force transmitting member, more particularly for the universal joints in automobiles and the like, comprising two sleeves adapted to receive connecting bolts, means adapted to hold said sleeves spaced apart from each other, an endless flexible tensile member circumferentially embracing said sleeves, and means embracing said member to permanently hold said member in contact to said sleeves.

4. A resilient tensile force transmitting member, more particularly for the universal joints in automobiles and the like, comprising, a body capable of yielding resiliently to pressure, a tensile member enclosing said body on two opposite sides, sleeves for attaching connecting bolts within said tensile member, and clamps embracing said tensile member and adapted to hold it against said sleeves, said clamps being securely connected to said sleeves.

5. A resilient tensile force transmitting member, more particularly for the universal joints in automobiles and the like, comprising, a body capable of yielding resiliently to pressure, an endless tensile member enclosing said body, two sleeves adjacent two opposite ends of said body and arranged within said tensile member, and two clamps of sheet metal each secured to one of said sleeves and adapted to hold said tensile member against said sleeves.

6. A resilient force transmitting member, more particularly for the universal joints in automobiles and the like, comprising, an elongated body of resilient material, a sleeve arranged at each narrow end of said body, an endless flexible tensile member enclosing said body and bearing close against said sleeves, and pieces of sheet metal arranged in pairs at each narrow end of said body and partially surrounding said tensile member.

7. A resilient tensile force transmitting member, more particularly for the universal joints in automobiles and the like, comprising, a body capable of yielding resiliently to pressure, a tensile member enclosing said body on two opposite sides, sleeves for attaching connecting bolts within said tensile member, and clamps consisting of sheet metal pieces arranged in pairs at each end of said body on opposite sides thereof, said clamps having inwardly extending flanges.

8. A resilient tensile force transmitting member, more particularly for the universal joints in automobiles and the like, comprising a body of resilient material having substantially elliptical form, two sleeves embedded in said body adjacent its narrow ends, an endless flexible tensile member embedded in said body and surrounding said sleeves, and means embracing said member to hold said member permanently against said sleeves.

9. A resilient tensile force transmitting member, more particularly for the universal joints in automobiles and the like, comprising a body of resilient material having substantially elliptical form, two sleeves embedded in said body adjacent its narrow ends, an endless flexible tensile member embedded in said body and surrounding said sleeves, and two sheet metal members on opposite sides of each end of said body secured to said sleeves and each having a rim at it outside bent over at substantially right angles and adapted to the contour of said body.

10. A resilient tensile force transmitting member, more particularly for the universal joints in automobiles and the like, comprising an elongated body of resilient material, means for attaching external connecting means embedded in said body, a tensile member enclosing said attaching means and embedded in said body, and rigid means secured to said attaching means to hold said tensile member in permanent engagement with said attaching means.

11. A resilient tensile force transmitting member, more particularly for the universal joints in automobiles and the like, comprising two sleeves adapted to receive connecting bolts, means adapted to hold said sleeves spaced apart from each other, a tensile member embracing said sleeves and bearing against each of them, and flanged clamping members rigidly connected to said sleeves and circumferentially surrounding parts of said tensile member, so as to hold said member in close engagement with said sleeves.

In testimony whereof I affix my signature.

HANS KATTWINKEL.